(12) United States Patent
Ziegler

(10) Patent No.: US 11,780,324 B2
(45) Date of Patent: Oct. 10, 2023

(54) FUEL TANK FOR A VEHICLE

(71) Applicant: DEERE & COMPANY, Moline, IL (US)

(72) Inventor: Ralf Ziegler, Schifferstadt (DE)

(73) Assignee: DEERE & COMPANY, Moline, IL (US)

( * ) Notice: Subject to any disclaimer, the term of this patent is extended or adjusted under 35 U.S.C. 154(b) by 129 days.

(21) Appl. No.: 17/301,958

(22) Filed: Apr. 20, 2021

(65) Prior Publication Data
US 2021/0347251 A1 Nov. 11, 2021

(30) Foreign Application Priority Data

May 5, 2020 (DE) .......................... 102020205660.9

(51) Int. Cl.
*B60K 15/04* (2006.01)
*F01N 3/20* (2006.01)
*B60K 15/03* (2006.01)

(52) U.S. Cl.
CPC ...... *B60K 15/04* (2013.01); *B60K 2015/0321* (2013.01); *B60K 2015/03256* (2013.01); *B60K 2015/0458* (2013.01); *F01N 3/2066* (2013.01); *F01N 2610/1406* (2013.01)

(58) Field of Classification Search
CPC ............ B60K 15/04; B60K 2015/0321; B60K 2015/03256; B60K 2015/0458; F01N 3/2066; F01N 2610/1406
USPC ........................................................ 220/564
See application file for complete search history.

(56) References Cited

U.S. PATENT DOCUMENTS

| 1,435,001 | A | * | 11/1922 | Gilmore | ................. | B60K 15/06 137/574 |
| 2,733,573 | A | * | 2/1956 | Trotter | ...................... | F17C 1/00 222/3 |
| 3,207,203 | A | * | 9/1965 | Mack | ..................... | B60K 15/06 137/574 |
| 5,518,017 | A | * | 5/1996 | Snook, Jr. | ............... | B63B 11/04 137/577 |
| 6,223,526 | B1 | * | 5/2001 | Wissler | ............. | F02M 37/0082 220/564 |
| 8,857,160 | B2 | | 10/2014 | Haeberer | | |
| 2006/0254654 | A1 | * | 11/2006 | Cotton | ............... | F02M 37/0076 137/574 |

(Continued)

FOREIGN PATENT DOCUMENTS

| DE | 102008057521 A1 | 5/2010 |
| DE | 102016213103 A1 | 1/2018 |

(Continued)

*Primary Examiner* — J. Gregory Pickett
*Assistant Examiner* — Niki M Eloshway
(74) *Attorney, Agent, or Firm* — Taft Stettinius & Hollister LLP; Stephen F. Rost

(57) ABSTRACT

A fuel tank for a vehicle includes a main tank comprising a first tank volume defined by an outside wall and an auxiliary tank extending from an aperture provided in the outside wall. The auxiliary tank is formed as a pocket-shaped continuation of the outside wall into the first tank volume bounded by the outside wall. The auxiliary tank forms a second tank volume which is separated from the first tank volume and opens into a filler neck which runs inside the first tank volume and emerges on the outside wall of the main tank.

18 Claims, 1 Drawing Sheet

(56) References Cited

U.S. PATENT DOCUMENTS

| | | | | |
|---|---|---|---|---|
| 2007/0241115 A1* | 10/2007 | Baumann | ................ | H01F 27/14 |
| | | | | 220/564 |
| 2011/0272414 A1* | 11/2011 | Gaden | .................... | B60K 13/04 |
| | | | | 220/564 |
| 2014/0245995 A1* | 9/2014 | Deliyski | ............. | F02D 19/0613 |
| | | | | 123/456 |
| 2015/0345368 A1* | 12/2015 | Le Poul | ............ | B65D 51/1644 |
| | | | | 123/41.51 |
| 2016/0361992 A1* | 12/2016 | Aso | ........................ | G01N 25/00 |
| 2019/0263257 A1* | 8/2019 | Komura | ................ | B60K 15/03 |

FOREIGN PATENT DOCUMENTS

| EP | 2386017 B1 | 1/2013 |
|---|---|---|
| EP | 3375652 A1 | 9/2018 |

\* cited by examiner

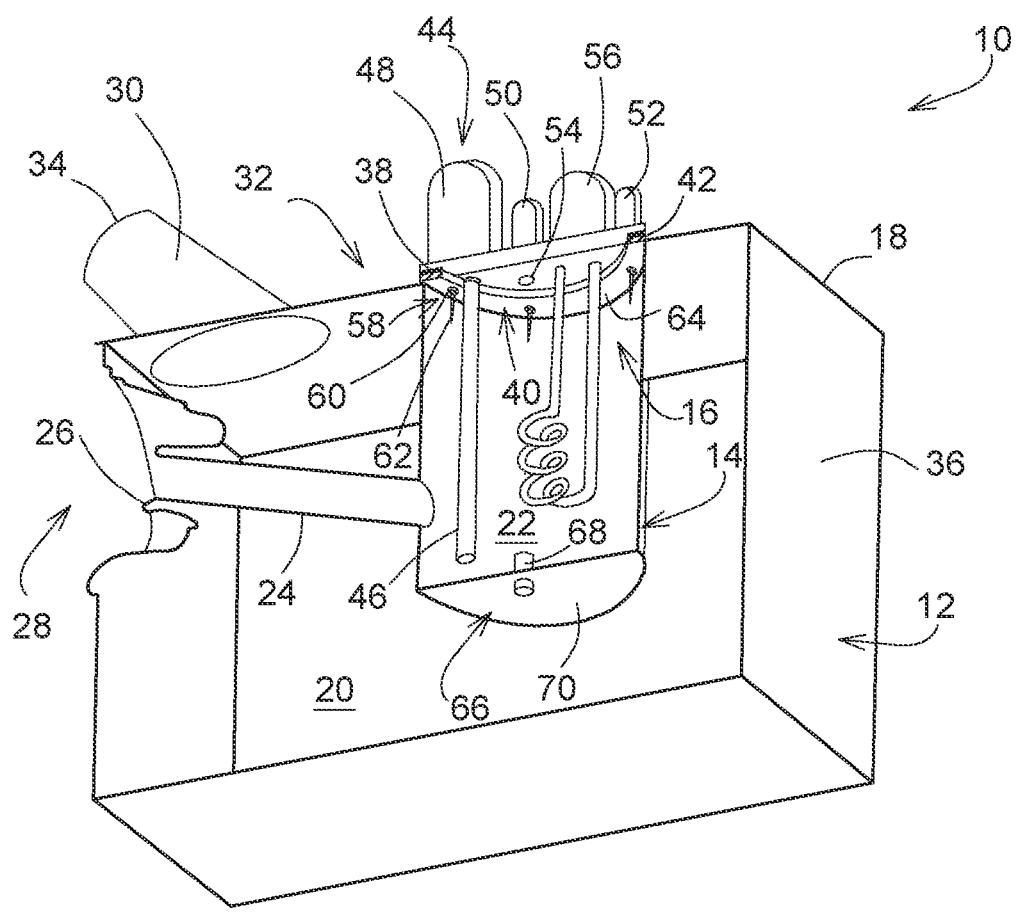

FUEL TANK FOR A VEHICLE

RELATED APPLICATIONS

This application claims priority to German Application No. 102020205660.9, filed May 5, 2020, the disclosure of which is hereby expressly incorporated by reference in its entirety.

FIELD OF THE DISCLOSURE

The present disclosure relates to a fuel tank for a vehicle having a main tank and an auxiliary tank.

BACKGROUND

A conventional fuel tank is used, among other things, in agricultural utility vehicles from the manufacturer, John Deere. The fuel tank includes a main tank for diesel fuel and an auxiliary tank for storing an aqueous urea solution that can be fed to an SCR catalytic converter for reduction of the nitrogen oxides contained in an exhaust gas flow from a diesel engine. The auxiliary tank and an associated filler neck are accommodated in a recess formed on the main tank and corresponding to their external contour. The tanks are separate vessels taking up a corresponding amount of overall space, which given the limited room available can place unwanted limitations on the filling capacity and hence the operating time of the agricultural utility vehicle.

There is a need, however, for a fuel tank which is optimized in terms of the overall space taken up by the main and auxiliary tank.

SUMMARY

According to the present disclosure, one embodiment of a fuel tank for a vehicle comprises a main tank and an auxiliary tank. The auxiliary tank extends from an aperture, which is provided in an outside wall of the main tank as a pocket-shaped continuation or recess of the outside wall into a first tank volume bounded by the outside wall, so as to form a second tank volume separated from the first tank volume. The second tank volume opens into a filler neck, which runs inside the first tank volume and emerges on the outside wall of the main tank. In other words, a part of the outer skin of the first tank volume forms the inner skin of the second tank volume.

The structural integration of the auxiliary tank and associated filler neck into the main tank achieved in this way leads to an especially compact formation of the fuel tank making optimum use of the overall space available. The filling capacity of the fuel tank can therefore be correspondingly increased for the same overall space required.

Use of the fuel tank is particularly feasible in vehicles equipped with a diesel engine, such as agricultural or forestry vehicles, construction-site vehicles or also automobiles and trucks. The main tank of larger tank volume than the auxiliary tank here serves to hold a diesel fuel, whereas an aqueous urea solution, intended for exhaust gas after-treatment, is stored in the auxiliary tank. The latter is also known under the designations "AdBlue" or "DEF" ("Diesel Exhaust Fluid"). In principle, however, the auxiliary tank can also be used for the space-saving storage of any other liquid media or automotive fluids such as, for example, hydraulic oil, windshield wiper liquid or the like.

A further filler neck, which opens into the main tank on the outside wall, is provided on the fuel tank. The filler neck is situated where it is easily accessible on an upper side of the main tank, for example.

It is also possible for the auxiliary tank to form an integral constituent part of the outside wall of the main tank. The fuel tank formed in this way may be composed of thermoplastic material, which is blow-molded, thermoformed or roto-formed or produced by another suitable hollow body forming process. The fuel tank may here be produced from one molding or in multiple parts, the individual constituent parts of the tank in the latter case being permanently welded or bonded together so as to produce an integral tank body. Depending on the tank capacity, the type of plastics used and the method of manufacture, the thickness of the outside wall of the tank body thus formed is typically in the range from 2 to 35 mm.

The aperture formed in the outside wall of the main tank is generally closed by a removable tank cap. In the assembled state the tank cap creates a liquid-tight fit along a fixing area formed on the outside wall. For this purpose, an elastic seal may run between the fixing area and the tank cap. Among other things, the tank cap may carry a dosing unit, which comprises a pump for delivering the urea solution contained in the auxiliary tank to an injection nozzle of an SCR catalytic converter, a filling level sensor and also sensors for registering the temperature, conductivity and other quality criteria of the urea solution. In addition, a tank ventilation and a temperature control device, which in operation of the vehicle serves to prevent the urea solution from potentially solidifying at winter temperatures, may be arranged on the tank cap. In this case, the tank cap forms a module, which combines all the operating components needed for supplying the SCR catalytic converter with urea solution. In the absence of a separate, removable tank cap, the aperture formed in the outside wall of the main tank may also be directly closed by a housing enclosed by one of the aforementioned operating components.

Along the fixing area an assembly device for attaching the tank cap or an assembly portion enclosed by the housing of the operating component may be embedded into the outside wall. In the case of a hollow-formed tank body the assembly device or the assembly portion is inserted into an associated injection mold and then at least partially encased with plastic. The assembly device may be threaded inserts distributed along the fixing area, into which corresponding clamping elements can be screwed for attaching the tank cap. The assembly device in this respect forms a fixing interface for receiving the screw-in clamping elements.

In addition, the fixing area may be formed as an undercut surrounding the aperture for attaching the tank cap. The undercut in this case projects into the aperture of the auxiliary tank to be closed, in particular so that an assembly device provided thereon, which serves for attaching the tank cap, lies inside the auxiliary tank. This obviates the need for a separate sealing of the assembly device as would be necessary in the case of an arrangement situated outside.

In order to facilitate cleaning of the auxiliary tank, the main tank and the auxiliary tank may be capable of connection to one another via a closeable drain valve, for example, in the shape of a drain screw plug. The drain valve may in particular be arranged in a base of the pocket-shaped auxiliary tank, in such a way that the latter is easily accessible from outside when the tank cap is removed. The liquid drained off from the auxiliary tank when cleaning then passes first into the main tank and from there can be pumped out. Alternatively, a cleaning pipe, which emerges from the fuel tank on an underside of the main tank, may also be connected to the drain valve. The liquid drained off from the auxiliary tank can thus be led through the main tank and caught by a receptacle.

The fuel tank is fitted to a supporting structure of the vehicle by clamping bands or by clamping elements as described in DE 10 2016 213 103 A1.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawing, wherein:

FIG. 1 shows a schematic cross-sectional representation of an exemplary embodiment of the fuel tank for a vehicle.

Corresponding reference numerals are used to indicate corresponding parts in the drawings.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

The fuel tank 10 comprises a main tank 12 for diesel fuel and an auxiliary tank 14 for storing an aqueous urea solution that can be fed to an SCR catalytic converter for reduction of the nitrogen oxides contained in an exhaust gas flow from a diesel engine. Such an aqueous urea solution is also known under the designations "AdBlue" or "DEF," i.e., Diesel Exhaust Fluid.

For reasons of clarity the diesel engine and the SCR catalytic converter—and other constituent parts of an exhaust system relating to this—are not reproduced in FIG. 1. Use of the fuel tank 10 is particularly feasible in any vehicles equipped with a diesel engine, such as agricultural or forestry vehicles, construction-site vehicles or automobiles and trucks, for example.

The fuel tank 10 here is fitted to a supporting structure of the vehicle by clamping bands or by clamping elements as described in DE 10 2016 213 103 A1.

As can be seen from FIG. 1, the auxiliary tank 14 extends from an aperture 16, which is provided in an outside wall 18 of the main tank 12, as a pocket-shaped uninterrupted continuation or recess of the outside wall 18 into a first tank volume 20 bounded by the outside wall 18, where it forms a second tank volume 22 separated from the first tank volume 20. The second tank volume 22 opens into a filler neck 24, which runs inside the first tank volume 20 and emerges on the outside wall 18 of the main tank 12. An outer end 26 of the filler neck 24 is accessible from outside in the area of a further recess 28 of the surrounding main tank 12, and in operation can be closed by a tank cap (not shown).

In addition, a further filler neck 30 is provided, which opens into the main tank 12 on the outside wall 18. The further filler neck 30 is situated on an upper side 32 of the main tank 12. An outer end 34 that can be closed by a further tank cap (not shown) in an altogether conventional manner points obliquely upwards away from the upper side 32 of the main tank 12.

In the fitted position on the vehicle in which the fuel tank 10 is intended to operate, the aperture 16 of the auxiliary tank 14 is situated, for example, on the upper side 32 of the main tank 12. This aperture has a circular cross section corresponding to the shape of the auxiliary tank 14. In this context it is also feasible, in a departure from the squared shape of the fuel tank 10 shown, for the main tank 12 to be formed as a polyhedron having further wall portions, in particular ones running at an oblique or skewed angle to one another, the aperture 16 of the auxiliary tank 14 being situated in one of these wall portions. FIG. 1 inasmuch shows only one of many possibilities.

The auxiliary tank 14 is an integral constituent part of the outside wall 18 of the main tank 12. The fuel tank 10 formed in this is composed of a thermoplastic material, which is blow-molded, thermoformed or roto-formed or produced by another suitable hollow body forming process. The fuel tank 10 here is produced from one molding or in multiple parts, the individual constituent parts of the tank in the latter case being permanently welded or bonded together so as to produce an integral tank body 36. Depending on the tank capacity, the type of plastics used and the method of manufacture, the thickness of the outside wall 18 of the tank body 36 thus formed is in the range from 2 to 35 mm.

The aperture 16 formed in the outside wall 18 of the main tank 12 is closed by a tank cap 38, the tank cap 38 creating a liquid-tight fit along a fixing area 40 formed on the outside wall 18. For this purpose, an elastic seal 42 runs between the fixing area 40 and the tank cap 38.

Among other things, the tank cap 38 carries a dosing unit 44, which in addition to a suction pipe 46 projecting into the auxiliary tank 14 comprises a pump 38 for delivering the urea solution contained in the auxiliary tank 14 to an injection nozzle of the SCR catalytic converter, a filling level sensor 50 and also sensors 52 for registering the temperature, conductivity and other quality criteria of the urea solution. In addition, a tank ventilation 54 and a temperature control device 56, which in operation of the vehicle serves to prevent the urea solution from potentially solidifying at winter temperatures, are arranged on the tank cap 38. In this case the tank cap 38 forms a module, which combines all the operating components needed for supplying the SCR catalytic converter with urea solution.

Along the fixing area 40 an assembly device 58 for attaching the tank cap 38 is embedded into the outside wall 18 to protect it against corrosion. In the case of the hollow-formed tank body 36 here, the assembly device 58 is inserted into an associated injection mold and then at least partially encased with plastic. The assembly device 58 takes the form of threaded inserts 60 distributed along the fixing area 40, into which corresponding clamping elements 62 can be screwed for attaching the tank cap 38.

According to the representation in FIG. 1, the fixing area 40 is formed as an undercut 64 surrounding the aperture 16 for attaching the tank cap 38. The undercut 64 projects into the aperture 16 of the auxiliary tank 14 to be closed, so that the assembly device 58 provided thereon lies inside the auxiliary tank 14. This undercut 64 is likewise an integral constituent part of the outside wall 18 of the main tank 12.

In order to facilitate cleaning of the auxiliary tank 14, the main tank 12 and the auxiliary tank 14 can be connected to one another via a closeable drain valve 66 in the shape of a drain screw plug 68. The drain valve 66 is arranged in a base 70 of the pocket-shaped auxiliary tank 14, in such a way that the latter is easily accessible from outside when the tank cap 38 is removed. The liquid drained off from the auxiliary tank 14 when cleaning then passes first into the main tank 12 and from there can be pumped out.

According to another embodiment and differing from the representation in FIG. 1, a channel can be formed in the bottom plate 70 of the auxiliary tank 14, which completely extends through the main tank 12 and emerges there underneath. A drain screw 68 is located at the outlet of the channel. This allows to empty the auxiliary tank directly to the outside.

While embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A fuel tank for a vehicle, comprising:
a main tank comprising a first tank volume defined by an outside wall;
an auxiliary tank extending from an aperture provided in the outside wall of the main tank, wherein the aperture is closed by a tank cap along a fixing area formed on the outside wall, the auxiliary tank formed as a pocket-shaped continuation of the outside wall into the first tank volume bounded by the outside wall, wherein the auxiliary tank forms a second tank volume which is separated from the first tank volume;
an assembly device for attaching the tank cap to the auxiliary tank, the assembly device disposed along the fixing area, wherein the assembly device lies inside the auxiliary tank;
wherein, the auxiliary tank opens into a first filler neck which runs inside the first tank volume and emerges on the outside wall of the main tank.

2. The fuel tank as claimed in claim 1, further comprising a second filler neck coupled to the main tank on the outside wall.

3. The fuel tank as claimed in claim 1, wherein the auxiliary tank is an integral constituent part of the outside wall of the main tank.

4. The fuel tank as claimed in claim 1, wherein the tank cap forms a liquid-tight fit along the fixing area formed on the outside wall.

5. The fuel tank as claimed in claim 4, wherein the aperture formed in the outside wall is closed by a housing of an operating component.

6. The fuel tank as claimed in claim 5, wherein along the fixing area the assembly device is surrounded by the housing of the operating component and is embedded into the outside wall.

7. The fuel tank as claimed in claim 1, wherein the assembly device for attaching the tank cap is disposed along the fixing area.

8. The fuel tank as claimed in claim 1, wherein fixing area is formed as an undercut surrounding the aperture for attaching the tank cap.

9. The fuel tank as claimed in claim 1, wherein the main tank and auxiliary tank are connected to one another via a closeable drain valve.

10. The fuel tank as claimed in claim 1, wherein the assembly device comprises one or more threaded inserts.

11. A fuel tank for a vehicle, comprising:
a main tank comprising a first tank volume defined by an outside wall, the main tank configured to store a first fluid in the first tank volume;
an auxiliary tank for storing a second fluid in a second tank volume, the auxiliary tank extending from an aperture formed in the outside wall of the main tank such that the auxiliary tank is formed as a pocket-shaped continuation of the outside wall into the first tank volume bounded by the outside wall, wherein the second tank volume is separate from the first tank volume;
a first filler neck comprising a first end and a second end, the first end being fluidly coupled to the second tank volume through the pocket-shaped continuation and the second end connected to the outside wall of the main tank, wherein the first filler neck runs inside the first tank volume to the second tank volume and is accessible from outside the main tank; and
a second filler neck fluidly coupled to the first tank volume, the first fluid neck passes through the first tank volume.

12. The fuel tank as claimed in claim 11, wherein the main tank comprises a recess formed in the outer wall, the second end of the first filler neck being connected to the recess.

13. The fuel tank as claimed in claim 11, further comprising a tank cap operably closing the aperture to form a liquid-tight fit along a fixing area of the outside wall.

14. The fuel tank as claimed in claim 13, further comprising a seal disposed between the tank cap and the fixing area.

15. The fuel tank as claimed in claim 13, wherein the tank cap comprises at least one of a dosing unit, a filling level sensor, a temperature sensor, and a conductivity sensor.

16. The fuel tank as claimed in claim 13, wherein fixing area is formed as an undercut surrounding the aperture for attaching the tank cap.

17. The fuel tank as claimed in claim 11, wherein the main tank and auxiliary tank are connected to one another via a closeable drain valve.

18. A fuel tank for a vehicle, comprising:
a main tank comprising a first tank volume defined by an outside wall, the main tank configured to store a first fluid in the first tank volume;
an auxiliary tank for storing a second fluid in a second tank volume, the auxiliary tank extending from an aperture formed in the outside wall of the main tank such that the auxiliary tank is formed as a pocket-shaped continuation of the outside wall into the first tank volume bounded by the outside wall, wherein the second tank volume is separate from the first tank volume;
a first filler neck comprising a first end and a second end, the first end being fluidly coupled to the second tank volume through the pocket-shaped continuation and the second end connected to the outside wall of the main tank, wherein the first filler neck passes through the first tank volume and is accessible from outside the main tank;
a second filler neck fluidly coupled to the first tank volume; and
a tank cap operably closing the aperture to form a liquid-tight fit along a fixing area of the outside wall;
wherein, the main tank and auxiliary tank are connected to one another via a closeable drain valve.

* * * * *